Nov. 2, 1965    W. A. ALEXANDER ETAL    3,215,031
LIGHT GUIDE SYSTEM FOR SEISMIC CORRECTIONS
Filed Dec. 7, 1961    2 Sheets-Sheet 1

WARREN A. ALEXANDER
JOHN T. BAKER    INVENTORS

BY John D. Gassett
ATTORNEY

Nov. 2, 1965　　　W. A. ALEXANDER ETAL　　　3,215,031
LIGHT GUIDE SYSTEM FOR SEISMIC CORRECTIONS
Filed Dec. 7, 1961　　　　　　　　　　　　　2 Sheets-Sheet 2

WARREN A. ALEXANDER
JOHN T. BAKER　　INVENTORS

BY John D. Gassett
ATTORNEY

# United States Patent Office 3,215,031
Patented Nov. 2, 1965

3,215,031
LIGHT GUIDE SYSTEM FOR SEISMIC
CORRECTIONS
Warren A. Alexander and John T. Baker, Tulsa, Okla., assignors, by mesne assignments, to Esso Production Research Company, Houston, Tex., a corporation of Delaware
Filed Dec. 7, 1961, Ser. No. 157,766
11 Claims. (Cl. 88—1)

The present invention concerns seismic records. It especially pertains to a system for presenting seismic data in which corrections for individual traces are introduced in a novel manner.

Geophysical prospecting using artifically induced seismic disturbances has found wide application in the search for petroleum and other products. It is the general practice to initiate an explosion or other seismic disturbance at a point near the surface of the earth to direct seismic waves downwardly into the earth from that point. The waves travel downwardly within the earth until they encounter reflecting interfaces between various substrata formations and the like. By arranging a plurality of geophones or other seismic transducers at spaced distances from the seismic disturbance point, it is possible to detect the arrival of the reflected seismic waves at the surface of the earth. These detected waves are translated into electrical pulses or signals which are then indicative of the character of the ground motion and are usually referred to collectively as a seismic signal which is in effect a composite signal made up of a plurality of electrical signals varying in frequency and amplitude.

The usual practice has been to examine the characteristics of the recording made of the seismic signals by correlating a plurality of traces on a seismic record. Seismic observers can be observing such traces, determine the shape of reflected subsurface formations. By accurately recording the time required for the seismic waves to travel to their reflection surfaces and return to the geophones, it is possible to determine the depths to such reflection surfaces. In the past it has been the general practice to amplify the seismic signals generated by geophones and to record the signal by means of a suitable camera. The camera may take the form of a recording oscillograph or as is more recently the case, it may take the form of a magnetic or photographic recording device capable of recording the signal in reproducible form. It is this amplified record signal with which seismic computers make their studies.

Most conventional seismographs, that is devices for recording the seismic signals, are capable of recording up to 24 or more separate seismic signals simultaneously. Thus if a seismic observation results in 24 seisimic signals being generated at as many detection stations, the resulting seismogram is a 24 trace record of the resulting 24 signals. These traces are usually arranged in a side-by-side relationship and a timing trace indicating predetermined time intervals is simultaneously recorded with the seismic signals to indicate the elapsed time after the shot to any point on each trace. The records thus obtained when mounted side-by-side are commonly referred to as a seismic section. The sections are analyzed and it has been possible to learn a great deal about the earth's structure through their use.

The accuracy of exploration by seismic methods depends to a large extent upon the ability of an observer to analyze recorded seismic information. Variable density sections presentation has become especially popular as an aid to the seismic observer. In variable density presentation, the signal is reproduced as a photographic trace which varies in density along its length in proportion to the intensity of the signal. This affords a very striking and accurate vertical cross section or profile reproduction of a portion of the earth under study.

Regardless of the type seismic section produced, they are normally corrected for static and for dynamic errors. The so-called static corrections are introduced to compensate for such things as the height of the geophone relative to an assumed datum plane, the velocity of the waves through a low velocity layer immediately adjacent the earth, and the elevation of the disturbance or the shot point relative to the datum plane, etc. The second type of corrections that is normally made to seismic records is the so-called dynamic or variable type in that the magnitude of the correction varies with the time for the signals that are received by any given geophone or transducer location. That category of corrections includes spread or stepped-out corrections which is a function of the distance of the geophone location from the shot point. It also includes any correction that is occasioned by variation in seismic velocity with depth in the section of earth under study.

Seismic corrections, as noted above, are calculated by various means and are incorporated into the seismic section or seismogram. However, the earth is quite complex in structure and no known means have been established whereby such corrections are unfailable. When such corrections are applied to a seismic section, they are, of course, quite helpful but nearly always one or more of the traces of the seismic section is not in its proper position relative to the seismic section as a whole. When traces are out of position, it complicates and makes much more difficult the analysis of such seismic section. It is one object of the present invention to provide a system in which individual traces of a seismic section can be adjusted relative to the other traces while the section is under observation.

Briefly, in a preferred embodiment, the invention pertains to a system for making corrections to a seismic section composed of side-by-side traces. A plurality of parallel rows of flexible light wave guides are provided in which a row is provided for each trace of the seismic section to be corrected. The width of each row of flexible wave guides is the approximate width of each trace. Each such row comprises a plurality of thin ribbons of vertical light wave guides. The lower ends of such ribbons are held in essentially a fixed position and means are provided to longitudinally move the upper ends of the ribbons in each row independently of the movement of the ribbons in the other rows. A frame is provided for holding the rows in parallel relationship. Means are provided for moving the upper part of each row relative to the upper part of the other rows. Means are provided to display an image of a seismic section upon the lower fixed surfaces of the rows. The individual rows are then adjusted as desired as an aid in analyzing the section under consideration.

The upper surface of the plurality of rows of wave guides displays the seismic section which is projected onto the lower side thereof. The individual rows or traces then are moved and while the section is being observed when the traces are aligned as desired, the new correlation of the seismic section with the rest of the traces is thus ascertainable. After the required corrections have been determined or made, a photograph of the top surfaces of the rows of light guides can be made. Alternatively the observed corrections for each trace can be incorporated into usual magnetic tape or photographic processes in which corrections can be made. This system removes any uncertainty of making corrections using the usual methods of magnetic tape or photographic processes of corrections.

Other objects and a more complete understanding of the invention may be had from the following description taken in conjunction with the drawing in which.

Figure 1:
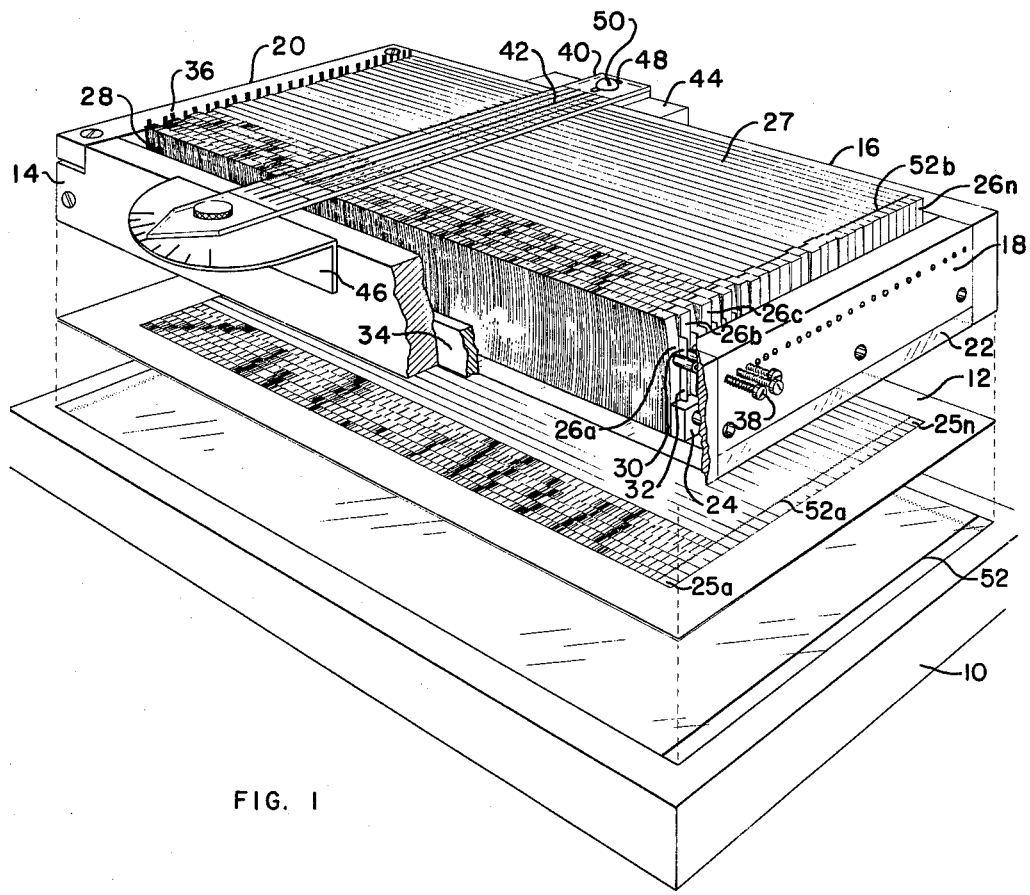
FIG. 1 is a perspective view of a preferred embodiment of the invention.

Referring to the drawing and FIG. 1 in particular, there is illustrated the best mode contemplated for carrying out the invention. It includes a light source such as light table 10 upon which can be placed a seismic section film 12. The frame, as shown above film 12, includes side plates 14 and 16, and end plates 18 and 20.

The lower side of the frame is enclosed by a transparent member 22 which may be glass, thus more or less forming a box comprising side members 14 and 16, and end members 18 and 20, and bottom 22. Mounted within the box and adjacent member 22 is a first spacer bar 24 adjacent to end member 18. A similar spacer bar not illustrated is adjacent to end member 20. The purpose of the spacer bars will be more apparent hereinafter. Mounted between the spacer bars are a plurality of rows 26a, 26b, 26c . . . 26n of flexible light wave guides. The flexible light guide row comprises a plurality of thin ribbons 28 of transparent plastic such as Cronar, Mylar, or Lucite. The ribbons should have good light transmission qualities. Further, the ribbons should have an index of refraction different from air so as to have light wave guide action. The width of each individual ribbon is preferably equal to the trace width on the section which is being processed, that is the approximate width of the individual trace on record 12. The individual ribbons 28 have a thickness corresponding to the small time increment of interest on the seismic record 12 which is normally 1 to 2 milliseconds. Depending upon the relative size of record 12, this usually corresponds to a thickness of a ribbon of about .003 to .01 inch. The lower end of each row is held in a fixed position between bars 24. The length of each ribbon 28 is sufficient to permit the upper end of the row to move through the complete range of correction to be applied while the lower end is held fixed. It has been found that a length of about 2 inches is in most cases quite suitable when the height of bar 24 is about ½ of an inch.

Rows 26a and 26b are separated by a spacer element which can comprise an upper spacer 30 and a lower spacer 32. Lower spacer 32 is preferably slightly thicker than spacer 30. This permits the lower end of each row to be held firmly between spacer plate 34 which is fastened to side 14 and its corresponding spacer plate not shown which is fastened to side 16. The upper ends of each row above spacer 32 then are not held so tightly laterally as the lower ends as spacers 30 are not so thick. These spacers are helpful in permitting a longitudinal movement of the upper portion of each row independently of its adjacent row. It has been found that a convenient thickness for lower spacer 32 is about .01 inch and the thickness of spacer 30 has been found to be about .002 inch. The spacers 30 and 32 preferably extend for the full longitudinal length of each row. The upper end of wave guide row 26a is held between spring members 36 at one end and adjustable set screws 38 at the other end.

Also shown in FIG. 1 is a transparent bar 40 extending laterally across the top surface of the rows of the wave guides. The transparent bar has lateral lines 42 placed permanently thereon. The transparent bar is supported between a sliding block 44 at one end and a traveling scale 46 at the other end. The transparent bar has a slot 48 at one end through which a set screw 50 is inserted and is fastened to sliding block 44 so that the transparent bar 40 can be set at a selected angle laterally.

In operation of the device shown in FIG. 1 a seismic section 12 which is to be processed is placed upon the top of light source 10. As can be seen, section 12 represents a VD section (variable density section) which has many traces 25a to 25n. It will be seen that these traces 25a to 25n correspond to the rows 26a to 26n of flexible light wave guides. A reference line 52 is conveniently placed across the top of light source 10. An image of reference line 52 is indicated as 52a on seismic section 12 and as 52b on the top surface of the wave guides. The presence of the reference line 52a and its images 52b clearly permits one to determine accurately and promptly the longitudinal displacements of any row 26a through 26n. In FIG. 1 is shown in exploded view so as to give a clear picture of the light source, the section, and the rows of wave guides.

In operation section 12 is placed on top of light source 10 so that light will shine upwardly therethrough. In operation section 12 is placed on top of light source 10 and the bottom plate 22 is placed upon section 12. Thus light from light source 10 causes an image of section 12 to be formed on the lower surface of the light wave guides. This image is guided upwardly to the upper surface of the wave guides where this image can be observed. Longitudinal adjustments of image of each trace are accomplished by adjusting screws 38. This adjustment is made independently for each trace for which a correction or adjustment is desired. Normally, transparent bar 40 will be used as an aid in lining up an event. After all adjustments have been made as desired by the longitudinal movement of the image of each trace, a photograph may be made of the upper surface 27. Also the corrections can be obtained from the displacement of the image 52b of the reference line 52. Thereafter the data can be reprocessed using the corrections thus obtained.

In the device shown in FIG. 1 it was shown to be desirable to have the width of each row of wave guides corresponding fairly closely to the width of the trace on section 12 or the individual traces could also be a whole multiple times the width of rows 26a. However, as all seismic records do not have the same width traces, it is therefore desirable to provide means whereby the device of FIG. 1 can be used with sections of different trace widths. A modification permitting this is shown in FIG. 2.

Figure 2:
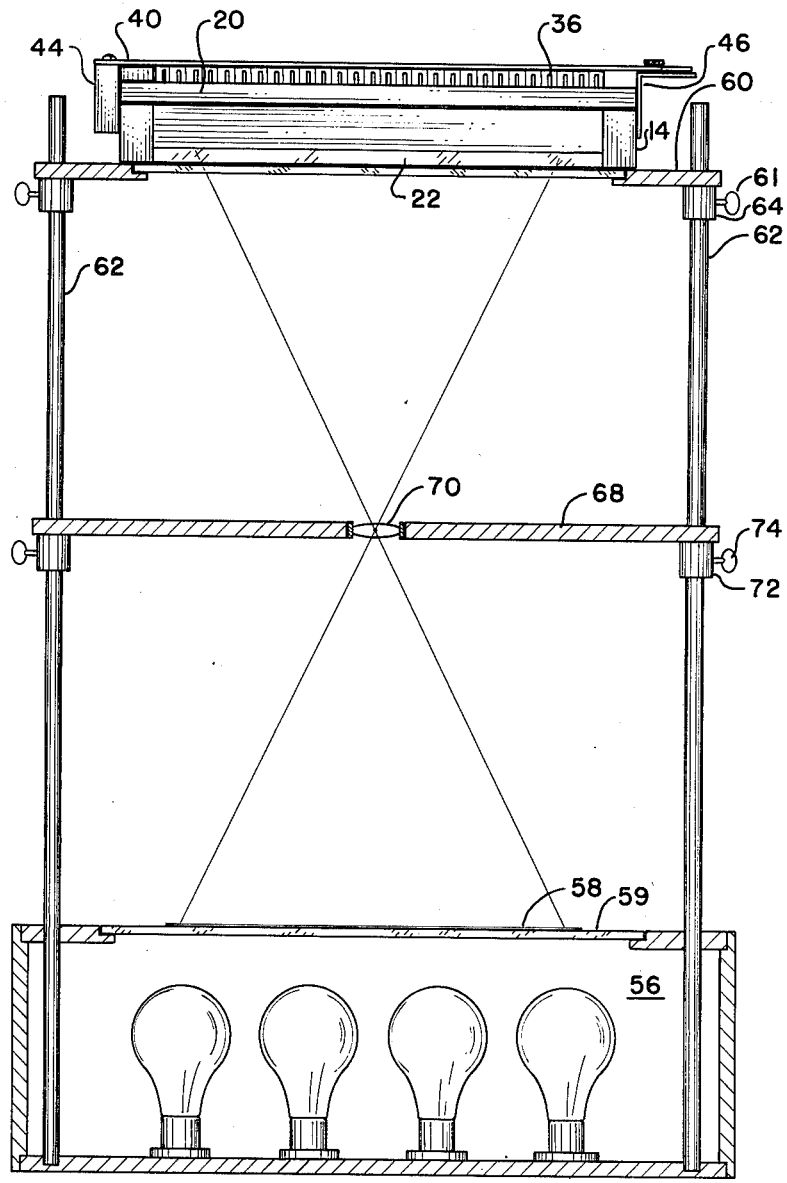
FIG. 2 illustrates an end view of a modification of the embodiment in FIG. 1.

In FIG. 2 the light source 56 and seismic section 58 are spaced from the lower side of plate 22. As illustrated thereon, the light wave guides and the accompanying frame are mounted on a supporting plate 60. Plate 60 has holes through which are fitted vertical rods 62; thus plate 60 has vertical movement with respect to rod 62. Plate 60 is held in place by collar 64 and set screw 61. Mounted below plate 60 is a second plate 68 supporting lens 70 in the center thereof. Lens 70 can be a Wollensak 162 mm. focal length $f4.5$ double convex lens. Plate 68 has vertical holes through which are fitted rod 62 similarly as plate 60. Plate 68 is held in adjusted position by collar 72 having set screw 74.

In operation of the device of FIG. 2, section 58 which is desired to be processed, is placed upon the top plate 59 of light source 56. Plates 68 and 60 are then moved as required so that the images of the traces of section 58 correspond closely in width to the width of the rows of wave guides 26a to 26n. Once the positions of plates 60 and 68 have been determined and set the corrections are added to the seismic sections similarly as described above in relation to FIG. 1.

While there are above disclosed but a limited number of embodiments of the system of the invention herein presented, it is possible to produce still other embodiments without departing from the inventive concept herein disclosed. It is therefore desired that only such limitations be imposed on the appended claims as are stated therein.

What is claimed is:

1. An apparatus for use in making corrections to a seismic section composed of side-by-side traces which comprises in combination: a plurality of elongated rows of light guides, each such row being composed of a plurality of thin ribbons having an upper end and a lower end, each such ribbon being of approximately the same length, each ribbon having a thickness not greater than the small time increment of interest on the seismic section and a width approximately that of an individual trace; means to hold the lower end of each such row in a relatively fixed position; and means to move longitudinally the upper ends of the ribbons of each said row independently of the ribbons of the other rows.

2. An apparatus for use in making corrections to a seismic section composed of side-by-side traces which comprises in combination: a plurality of rows of a plurality of thin, flexible wave guides, each said row having an upper surface which is movable with respect to its lower surface, each wave guide having a thickness not greater than the small time increment of interest on the seismic section and a width approximately that of an individual trace; means to hold said rows in a parallel side-by-side relationship; means to hold the lower ends of the lower surfaces of said rows in a relatively fixed position; and means to move the upper longitudinal position of each row independently.

3. An apparatus for use in making corrections to a seismic section composed of side-by-side traces which comprises in combination: a plurality of rows of a plurality of thin, flexible wave guides, each said row having an upper surface which is movable with respect to its lower surface, each wave guide having a thickness not greater than the small time increment of interest on the seismic section and a width approximately that of an individual trace; first means to hold said rows in a parallel side-by-side relationship; means to hold the lower surfaces of said rows in a relatively fixed position; positioning means to move the upper surface of each row of wave guides independently; an upper plate for supporting said first means, said upper plate having an aperture therein corresponding to the approximate area occupied by the lower surfaces of said rows; a second plate positioned below said upper plate and having an optical lens therein; a third plate positioned below said second plate for holding said seismic section; a light source for causing an image of said section to be projected through said lens onto the lower surfaces of said rows; a first adjusting means to adjust the position of said upper plate with respect to said second plate and said third plate; and second adjusting means for adjusting the position of the second plate with respect to said upper plate and said third plate.

4. An apparatus for use in making corrections to a seismic section composed of side-by-side traces which comprises in combination: a plurality of elongated rows of a plurality of thin, flexible light guides, each such row having an upper surface movable with respect to its lower surface, each light guide having a thickness not greater than the small time increment of interest on the seismic section and a width approximately that of an individual trace; a first frame for holding said rows and including means to hold the lower surfaces of each said row in a fixed position in relation to said frame; means to move independently the upper surface of each said row of light guides; second frame means for holding the seismic section in a fixed position relative to said first frame, said frame being of a character to support said first frame; and light means positioned for projecting an image of said section on the lower surface of said rows.

5. An apparatus as defined in claim 4 in which the light source includes means capable of continuously projecting a reference line onto the lower surfaces of said rows.

6. An apparatus for use in making corrections to a seismic section composed of side-by-side traces which comprises in combination: a plurality of elongated rows of flexible light guides, each such row being composed of a plurality of thin flexible ribbon-like wave guides having an upper end and a lower end, each such wave guide being of approximately the same length, each ribbon-like wave guide having a thickness not greater than the small time increment of interest on the seismic section and a width approximately that of an individual trace; a spacer element between adjacent said rows, the lower part of said spacer element being thicker than the upper part; means to hold the lower end of each said such row in a relatively fixed position; and means to move longitudinally the upper ends of the light guides of each said row independently of the light guides of the other rows.

7. An apparatus for use in making corrections to a seismic section composed of side-by-side traces which comprises in combination: a plurality of parallel elongated rows of a plurality of thin, flexible light guides, each row having an upper surface movable with respect to its lower surface, each light guide having a thickness not greater than the small time increment of interest on the seismic section and a width approximately that of an individual trace; a frame for holding said rows; means to hold the lower surface of each said row in a fixed position in relation to said frame; means to move independently the upper surfaces of each said row of light guides; and a spacer element between adjacent rows, the lower part of said spacer elements being thicker than the upper part.

8. An apparatus for use in making corrections to a seismic section composed of side-by-side traces which comprises in combination: a plurality of elongated rows of a plurality of thin, flexible light guides, each such row having an upper surface movable with respect to its lower surface, each light guide having a thickness not greater than the small time increment of interest on the seismic section and a width approximately that of an individual trace; a first frame for holding said rows including means to hold the lower surface of each said row in a fixed position in relation to said frame; means to move independently the upper surface of each said row of light guides; second frame means for holding the seismic section, said frame being of a character to support said first frame; a spacer element between adjacent said rows; and light means positioned for projecting an image of said section on the lower surfaces of said rows.

9. An apparatus for use in making corrections to a seismic section composed of side-by-side traces which comprises in combination: a plurality of rows of a plurality of thin, flexible light wave guides, each said row having an upper surface which is movable with respect to its lower surface, light wave guide having a thickness not greater than the small time increment of interest on the seismic section and a width approximately that of an individual trace; first means to hold said rows in a parallel side-by-side relationship; means to hold the lower surfaces of said rows in a relatively fixed position; a spacer element between adjacent rows, the lower part of said spacer element being thicker than the upper part; positioning means to move the upper surface of each row of light wave guides independently; an upper plate for supporting said first means, said upper plate having an aperture therein corresponding to the approximate lower surface of said rows; a second plate positioned below said upper plate and having an optical lens therein; a lower plate positioned below said second plate and capable of holding said seismic section; a light source operable to cause an image of said section to be projected through said lens onto the lower surfaces of said rows; a first adjusting means to adjust the position of said upper plate with respect to said second plate and said lower plate; and second adjusting means for adjusting the position of the second plate with respect to said upper plate and said lower plate.

10. An apparatus for use in making corrections to a seismic section composed of side-by-side traces having small time increments which comprises in combination: a plurality of elongated rows of light guides, each such row being composed of a plurality of thin ribbons having an upper end and a lower end, each such ribbon being of approximately the same length, each such row having an upper surface movable with respect to its lower surface, each individual ribbon having a width approximately that of the individual trace and a thickness corresponding to the small time increment of interest on such seismic section; a first frame for holding said rows including means to hold the lower surface of each said row in a fixed position in relation to said frame; adjusting means to move independently the upper surface of each said row; second frame means for holding a seismic section, said frame being of a character to support said first frame; a spacer element between adjacent said rows, the lower part of said spacer element being thicker than the upper part; means for projecting an image of said section on the lower surface of said rows; a transparent bar means having a lateral line thereon; means to pivotally support said transparent bar from said frame across the top surfaces of said rows.

11. An apparatus as defined in claim 10 in which the adjusting means include means to resiliently urge each row in one longitudinal direction and means to forcibly move each row in the opposite longitudinal direction.

References Cited by the Examiner

UNITED STATES PATENTS

| | | | |
|---|---|---|---|
| 1,994,091 | 3/35 | Shwartz | 88—24 |
| 2,707,524 | 5/55 | Montgomery | 346—33 |
| 2,982,175 | 5/61 | Eisler | 88—1 X |
| 3,060,796 | 10/62 | Muse | 88—24 |

JEWELL H. PEDERSEN, *Primary Examiner.*